United States Patent
Aingaran et al.

(10) Patent No.: US 9,158,810 B2
(45) Date of Patent: Oct. 13, 2015

(54) HARDWARE MESSAGE QUEUES FOR INTRA-CLUSTER COMMUNICATION

(71) Applicant: Oracle International Corporation, Redwood Shores, CA (US)

(72) Inventors: Kathirgamar Aingaran, San Jose, CA (US); William H. Bridge, Jr., Alameda, CA (US); Garret F. Swart, Palo Alto, CA (US); Sumti Jairath, Santa Clara, CA (US); John G. Johnson, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 33 days.

(21) Appl. No.: 13/778,307

(22) Filed: Feb. 27, 2013

(65) Prior Publication Data

US 2014/0096145 A1    Apr. 3, 2014

Related U.S. Application Data

(60) Provisional application No. 61/709,142, filed on Oct. 2, 2012.

(51) Int. Cl.
*G06F 3/00* (2006.01)
*G06F 9/44* (2006.01)
(Continued)

(52) U.S. Cl.
CPC ........ *G06F 17/30442* (2013.01); *G06F 9/3867* (2013.01); *G06F 9/546* (2013.01);
(Continued)

(58) Field of Classification Search
CPC ................................. G06F 17/30442

USPC ........................................................ 719/314
See application file for complete search history.

(56) References Cited

U.S. PATENT DOCUMENTS

| RE34,052 E | 9/1992 | Hester et al. |
| 5,423,010 A | 6/1995 | Mizukami |

(Continued)

FOREIGN PATENT DOCUMENTS

| EP | 1 111 500 A1 | 3/1996 |
| EP | 2040180 A1 | 3/2009 |

(Continued)

OTHER PUBLICATIONS

Actian, "Vectorwise: Beyond Column Stores", Technical White Paper, dated 2012, 17 pages.
(Continued)

*Primary Examiner* — Timothy A Mudrick
(74) *Attorney, Agent, or Firm* — Hickman Palermo Becker Bingham LLP (57) ABSTRACT

A method and apparatus for sending and receiving messages between nodes on a compute cluster is provided. Communication between nodes on a compute cluster, which do not share physical memory, is performed by passing messages over an I/O subsystem. Typically, each node includes a synchronization mechanism, a thread ready to receive connections, and other threads to process and reassemble messages. Frequently, a separate queue is maintained in memory for each node on the I/O subsystem sending messages to the receiving node. Such overhead increases latency and limits message throughput. Due to a specialized coprocessor running on each node, messages on an I/O subsystem are sent, received, authenticated, synchronized, and reassembled at a faster rate and with lower latency. Additionally, the memory structure used may reduce memory consumption by storing messages from multiple sources in the same memory structure, eliminating the need for per-source queues.

18 Claims, 8 Drawing Sheets

(51) Int. Cl.

| | |
|---|---|
| *G06F 9/46* | (2006.01) |
| *G06F 13/00* | (2006.01) |
| *G06F 17/30* | (2006.01) |
| *G06F 9/54* | (2006.01) |
| *G06F 9/38* | (2006.01) |
| *G06F 12/08* | (2006.01) |
| *G06F 12/12* | (2006.01) |
| *G06F 15/173* | (2006.01) |
| *G06F 12/14* | (2006.01) |

(52) U.S. Cl.
CPC ......... *G06F 12/082* (2013.01); *G06F 12/0804* (2013.01); *G06F 12/12* (2013.01); *G06F 12/1408* (2013.01); *G06F 15/17331* (2013.01); *G06F 17/30483* (2013.01); *G06F 17/30498* (2013.01); *G06F 17/30501* (2013.01); *G06F 17/30519* (2013.01); *G06F 17/30595* (2013.01); *Y02B 60/188* (2013.01)

(56) References Cited

U.S. PATENT DOCUMENTS

| | | | |
|---|---|---|---|
| 5,581,705 A * | 12/1996 | Passint et al. | 709/200 |
| 5,617,567 A | 4/1997 | Doktor | |
| 5,826,259 A | 10/1998 | Doktor | |
| 6,047,081 A | 4/2000 | Groezinger et al. | |
| 6,317,824 B1 | 11/2001 | Thakkar et al. | |
| 6,671,797 B1 | 12/2003 | Golston | |
| 6,745,174 B2 | 6/2004 | Levy et al. | |
| 6,826,522 B1 | 11/2004 | Moller et al. | |
| 6,842,848 B2 | 1/2005 | Hokenek et al. | |
| 7,047,252 B2 | 5/2006 | Buch et al. | |
| 7,725,595 B1 * | 5/2010 | Geissler et al. | 709/235 |
| 7,769,726 B2 | 8/2010 | Gitai et al. | |
| 7,861,060 B1 | 12/2010 | Nickolls et al. | |
| 7,991,794 B2 | 8/2011 | Bedi et al. | |
| 8,049,760 B2 | 11/2011 | Jiao et al. | |
| 8,126,855 B2 | 2/2012 | Faerber et al. | |
| 8,260,803 B2 | 9/2012 | Hsu et al. | |
| 8,285,709 B2 | 10/2012 | Candea et al. | |
| 8,326,810 B2 | 12/2012 | Faerber et al. | |
| 8,521,788 B2 | 8/2013 | Ellison et al. | |
| 8,533,216 B2 | 9/2013 | Buger et al. | |
| 8,543,534 B2 | 9/2013 | Alves et al. | |
| 8,572,131 B2 | 10/2013 | Ellison et al. | |
| 8,725,707 B2 | 5/2014 | Chen et al. | |
| 8,938,644 B2 | 1/2015 | Clark et al. | |
| 8,996,463 B2 | 3/2015 | Merriman et al. | |
| 2002/0184392 A1 * | 12/2002 | Parthasarathy et al. | 709/249 |
| 2002/0188830 A1 | 12/2002 | Boles et al. | |
| 2005/0177706 A1 | 8/2005 | Lee | |
| 2007/0203925 A1 | 8/2007 | Sandler et al. | |
| 2008/0046686 A1 | 2/2008 | Cameron | |
| 2008/0294863 A1 | 11/2008 | Faerber et al. | |
| 2009/0037700 A1 | 2/2009 | Graham | |
| 2010/0030796 A1 | 2/2010 | Netz et al. | |
| 2010/0088309 A1 | 4/2010 | Petculescu et al. | |
| 2010/0278446 A1 | 11/2010 | Ganesh et al. | |
| 2010/0299316 A1 | 11/2010 | Faerber et al. | |
| 2011/0029557 A1 | 2/2011 | Raghavan et al. | |
| 2012/0054225 A1 | 3/2012 | Marwah et al. | |
| 2012/0303633 A1 | 11/2012 | He et al. | |
| 2013/0151567 A1 | 6/2013 | Ellison et al. | |
| 2013/0151568 A1 | 6/2013 | Ellison et al. | |
| 2013/0275473 A1 | 10/2013 | Ellison et al. | |
| 2014/0013076 A1 | 1/2014 | Ganesh et al. | |
| 2014/0013077 A1 | 1/2014 | Ganesh et al. | |
| 2014/0013078 A1 | 1/2014 | Ganesh et al. | |
| 2014/0095748 A1 | 4/2014 | Aingaran et al. | |
| 2014/0095805 A1 | 4/2014 | Kapil et al. | |
| 2014/0096145 A1 | 4/2014 | Aingaran et al. | |

FOREIGN PATENT DOCUMENTS

| | | |
|---|---|---|
| EP | 2 423 843 A1 | 2/2012 |
| EP | 2423843 A1 | 2/2012 |
| JP | 2000261674 A | 9/2000 |
| WO | WO 00/08552 | 2/2000 |
| WO | WO2010/039895 | 4/2010 |
| WO | WO 2013/095653 A1 | 6/2013 |
| WO | WO 2013/095662 A1 | 6/2013 |

OTHER PUBLICATIONS

Monet DB, "Column Store Features", http://www.monetdb.org/Home/Features, last accessed on May 1, 2012, 3 pages.

Wikipedia, "Monet DB", http://en.wikipedia.org/wiki/MonetDB, last accessed on May 1, 2012, 3 pages.

W. Cockshott et al., "High-Performance Operations Using a Compressed Database Architecture", The Computer Journal, vol. 41, 1998, 14 pages.

Notification of Transmittal of the International Search Report and the Written Opinion of the International Searching Authority, or the Declaration, PCT Application No. PCT/US2012/068526, dated Mar. 20, 2013, 11 pages.

Claims from PCT Application No. PCT/US2012/068526, dated Mar. 2013, 3 pages.

Notification of Transmittal of the International Search Report and the Written Opinion of the International Searching Authority, or the Declaration, PCT Application No. PCT/US2012/068531, dated Mar. 20, 2013, 11 pages.

Wikipedia, "SIMD", Single Instruction Multiple Instruction, dated Jan. 1, 2013, 7 pages.

Brewer et al., "Remote Queues: Exposing Message Queues for Optimization and Atomicity", dated 1995 ACM, 12 pages.

Von Eicken et al., "Active Messages: A Mechanism for Integrated Communication and Computation", dated 1992, ACM, 12 pages.

Weinhardt, Markus, "Compilation and Pipeline Synthesis for Reconfigurable Architectures", 1997, 8 pages.

Schmit et al., "PipeRench: A Virtualized Programmable Datapath in 0.18 Micron Technology", dated 2002, 4 pages.

Park et al., "Polymorphic Pipeline Array: A Flexible Multicore Accelerator with Virtualized Execution for Mobile Multimedia Applications", Dated Dec. 12, 2009 11 pages.

Silva et al., "Using a Tighly-Coupled Pipeline in Dynamically Reconfigureable Platform FPGAs", dated May 2003, 4 pages.

Dynamic Scheduling Techniques, http://www.cs.iastate.edu/~prabhu/Tutorial/PIPELINE/dynamSchedTech.html, printed on Jul. 4, 2012, 2 pages.

CCCP: Accelerator Virtualization, http://cccp.eecs.umich.edu/research/virtual.php, printed on Jul. 4, 2012, 3 pages.

Ming et al., "An Efficient Attribute Based Encryption Scheme with Revocation for Outsourced Data Sharing Control", dated 2011, 6 pages.

Wang et al., "HyperSafe: A Lightweight Approach to Provide Lifetime hypervisor Control-Flow Integrity" IEEE, dated 2010, 16 pages.

Yu et al., "Attribute Based Data Sharing with Attribute Revocation" dated Apr. 13-16, 2010, ASIACCS, 10 pages.

Wang et al., "Hierarchical Attribute-based Encryption and Scalable User Revocation for Sharing Data in Cloud Servers", 2011, 12 pages.

Zhang, Long, "Attribute Based Encryption Made Practical", dated Apr. 2012, 62 pages.

Wikipedia, "In Memory Database", Dated Jan. 30, 2013, 4 pages.

Zhang, Long, "Attribute Based Encryption Made Practical" A Thesis Submitted in Partial Fulfillment of the Requirements for the Degree of Master of Science, dated Apr. 2012, 62 pages.

IBM, "Technical Disclosure Bulletin", Data Packing and Unpacking Scheme for High Performance Image Processing, vol. 36, No. 7, dated Jul. 1993, 6 pages.

Brewer et al., "Remote Queues: Exposing Message Queues for Optimization and Atomicity", dated Jul. 17, 1995, ACM, 12 pages.

(56) References Cited

OTHER PUBLICATIONS

U.S. Appl. No. 13/916,284, filed Jun. 12, 2013, Office Action, Aug. 15, 2014.
IBM Technical Disclosure Bulletin, "Data Packing and Upacking Scheme for High Performance Image Processing", vol. No. 7, dated Jul. 1993, 6 pages.
U.S. Appl. No. 13/916,284, filed Jun. 12, 2013, Interview Summary, Feb. 11, 2015.
U.S. Appl. No. 13/916,284, filed Jun. 12, 2013, Advisory Action, Mar. 10, 2015.
U.S. Appl. No. 13/789,524, filed Mar. 7, 2013, Ex Parte Quayle Action, Jun. 26, 2015.

* cited by examiner

HARDWARE MESSAGE QUEUES FOR INTRA-CLUSTER COMMUNICATION

CROSS-REFERENCE TO RELATED APPLICATIONS; BENEFIT CLAIM

This application claims the benefit of Provisional App. 61/709,142, filed Oct. 2, 2012, the entire contents of which is hereby incorporated by reference as if fully set forth herein, under 35 U.S.C. §119(e).

FIELD OF THE INVENTION

The present invention relates to using a specialized circuitry to send and receive messages from one or more nodes on a compute cluster.

BACKGROUND

Database systems distribute portions of a database across several nodes in a cluster in order to improve performance and provide scalability. Clusters are configured in one of two ways, as coherent memory clusters or compute clusters.

Nodes on a coherent memory cluster share physical memory. Sharing physical memory allows each node on the cluster to communicate very quickly. To send and receive messages between two nodes on a shared memory cluster, one node will write data to the shared memory and the other node will read the data from the shared memory. Unfortunately, coherent memory clusters are very expensive to build and there is a limit to the size of the shared memory that can be stored on a coherent memory cluster.

Nodes on a compute cluster do not share physical memory. Communication between nodes on a compute cluster may be performed through messages usually delivered over an I/O subsystem. An I/O subsystem may include an I/O link, a synchronization mechanism, and a server thread on the receiving node to process incoming messages. Furthermore, compute nodes may need to reassemble incoming messages and store the reassembled messages in a node's main memory. Such an IO subsystem incurs a performance penalty which increases the message latency and limits the message throughput.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Communication between nodes on a compute cluster, which do not share physical memory, is performed by passing messages over an I/O subsystem. The overhead for each node using the I/O subsystem is high. Each node may include a synchronization mechanism, a thread on the receiving node ready to receive connections, and other threads to process and reassemble messages. Frequently, a receiving node also maintains a separate queue in memory for each node on the I/O subsystem sending messages to the receiving node. Such overhead incurs a performance penalty which increases the latency and limits message throughput.

An efficient system for sending and receiving messages between nodes on a compute cluster is presented, herein referred to as the multi-HMQ system. The multi-HMQ system provides functionality for memory copies and message passing. Each node on the multi-HMQ system includes a hardware message queue ("HMQ"), a hardware message queue coprocessor ("HMQ coprocessor"), and a communication link that connects each HMQ coprocessor to the other HMQ coprocessors on the multi-HMQ system.

An HMQ comprises a header and a payload. The header in an HMQ comprises metadata regarding the state of the HMQ and pointers to particular entries or addresses in the payload. The HMQ coprocessor stores entries in the payload based on the commands the HMQ coprocessor receives. Each entry in the payload may also contain flags concerning the state of that particular entry.

HMQ coprocessors send commands to, and receive commands from, other HMQ coprocessors. The receiving HMQ coprocessor allocates an entry in the target HMQ, by atomically incrementing an allocation pointer in the HMQ header. The allocated entry is filled with an incoming message and a special completion flag is set in the entry. The HMQ coprocessor is capable of sending, receiving, authenticating, enqueuing, synchronizing, and reassembling incoming messages without further software intervention.

Due to the HMQ coprocessor, messages on the multi-HMQ system are exchanged at a faster rate and with lower latency. Faster messaging allows for higher performance of the multi-HMQ system and the compute cluster. Additionally, the HMQ may reduce memory consumption, compared to generic messaging applications, by storing messages from multiple sources on the same HMQ, eliminating the need for per-source queues.

The HMQ Coprocessor

HMQ coprocessors are specialized circuitry. The term "specialized circuitry" refers to digital circuits that perform a set of functions, and that are either hardwired to perform the set of functions or persistently programmed to perform the set of functions. Persistently programmed digital circuits include digital electronic application-specific integrated circuits (ASICs) or field programmable gate arrays (FPGAs). Specialized circuitry does not include a general purpose processor that is configured to perform functions by executing a software instruction set or program that can reside in memory.

In contrast, the term "software" refers to an instruction set or program executed by digital circuits that perform an expansive set of functions on a general purpose processor. Software is neither hardwired nor persistently programmed to perform specific functions. While software can be used to implement expansive functionality, software typically performs slower and requires more overhead than functions performed by specialized circuitry. For convenience of expression, when software is described as performing an act, instructions are being executed on a general purpose processor to perform the act.

HMQ coprocessors process a limited set of commands. For example, an HMQ coprocessor may, but is in no way limited to, process the following commands without executing software: Copy, Copy and Signal, Fill, Store, Atomic Add, Atomic Or, Atomic Message Push, Interrupt, Sync, and No-op.

HMQ coprocessors send commands to, and receive commands from, other HMQ coprocessors, without the assistance of software. For example, a first HMQ coprocessor may command a second HMQ coprocessor to store a message. The second HMQ coprocessor authenticates the command, allocates an entry in the target HMQ, and stores the payload in the target HMQ. The allocated entry is filled with the incoming message associated with a command and a special completion flag is set in the entry. The HMQ coprocessor performs these operations without software assistance.

As described herein the HMQ coprocessor may, but is in no way limited to, send commands to other HMQ coprocessors, receive commands from other HMQ coprocessors, authenticate commands received, enqueue entries into an HMQ, synchronize messages received, reassemble incoming messages, and report errors, without software intervention.

The Multi-HMQ System

Figure 1:
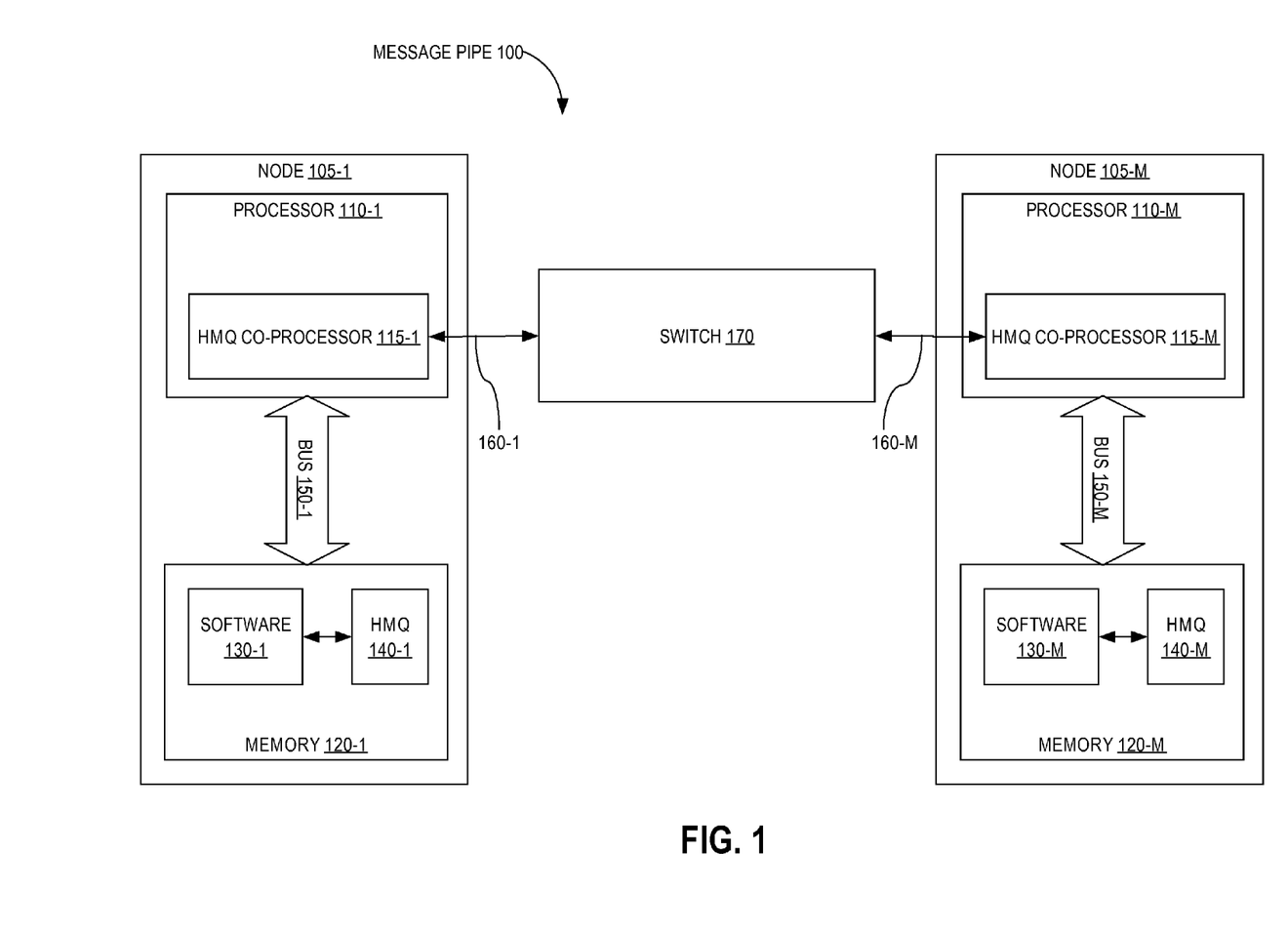
FIG. 1 is a block diagram that illustrates a node on a multi-HMQ system that employs an HMQ coprocessor to receive messages from other nodes on the compute cluster, according to an embodiment of the invention.

FIG. 1 is a block diagram that illustrates a multi-HMQ system 100, according to an embodiment. While FIG. 1 illustrates an embodiment, other embodiments may omit, add to, reorder, and/or modify any of the elements shown. The multi-HMQ system moves data from one memory location to another memory location. For example, HMQ coprocessor 115-1 may command coprocessor 115-M to store a message in memory 120-M on node 105-M. In the embodiment illustrated in FIG. 1, Multi-HMQ system 100 includes, but in no way limited to, nodes 105-1 through 105-M (collectively "nodes 105"), wherein nodes 105 include HMQ coprocessors 115-1 through 115-M (collectively "HMQ coprocessors 115"), respectively.

In the embodiment illustrated in FIG. 1, HMQ coprocessors 115 are located on-chip of processors 110-1 through 110-M (collectively "processors 110"), respectively. In another embodiment, HMQ coprocessors 115 are cores located on processors 110, respectively. HMQ coprocessor 115 may be located on the same board, but not the same chip, as processors 115, respectively. Alternatively, HMQ coprocessors 115 may be located elsewhere and merely communicatively coupled with processors 110, respectively.

In the embodiment illustrated in FIG. 1, HMQ coprocessor 115-1 is communicatively coupled with: bus 150-1; memory 120-1; software 130-1; HMQ 140-1; and other HMQ coprocessors 115. HMQs 140-1 through 140-M (collectively "HMQs 140") are each instances of HMQ 300. Further, HMQ coprocessors 115 are commutatively coupled through links 160-1 through 160-M (collectively referred to as "links 160"), respectively, and switch 170. However, in other embodiments, HMQ coprocessors may be directly connected, or communicatively coupled through other means, known by those skilled in the art.

As discussed above, software 130-1 through 130-M, collectively 130, refers to an instruction set or program stored on nodes 105, respectively, and executed on general purpose processors 110, respectively. Software 130-1 through 130-M (collectively "software 130"), is not hardwired or persistently programmed to perform specific functions. For convenience of expression, when software 130 is described as performing an act, instructions comprising software 130 are being executed on a processors 110, respectively, to perform the act.

HMQ Remote Access Keys ("HMQ RKEYs")

The HMQ coprocessor may not bound by an operating system and may have unfettered access to memory. An HMQ RKEY may be sent with each command and designate which HMQ an HMQ coprocessor should access. Furthermore, an HMQ RKEY may include the location and size of the memory allocated for the corresponding HMQ, and restrict the HMQ coprocessor to access memory allocated for the HMQ. Thus, it is important to make sure that an HMQ RKEY is valid and has not been forged or tampered with. To ensure that the HMQ coprocessor writes into an authorized space in memory, the HMQ coprocessor validates the HMQ RKEY sent with each command. For example, an HMQ RKEY may be created for each HMQ on each node in the multi-HMQ system. Multiple HMQs allocated on the same node may each have a unique HMQ RKEY, which designates the particular HMQ that the HMQ coprocessor should access for a given command.

Figure 2:
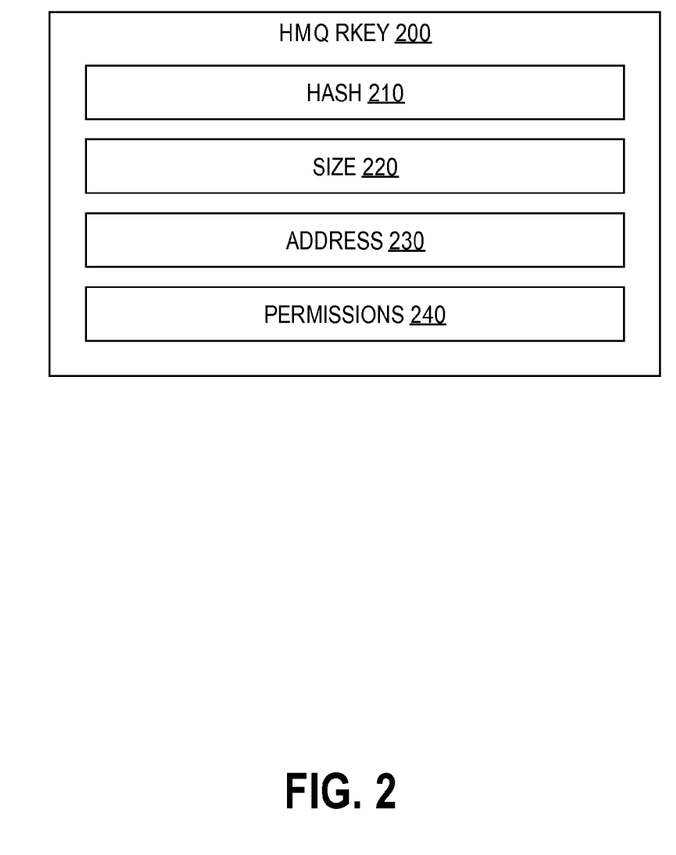
FIG. 2 is a block diagram of an HMQ RKEY, according to an embodiment.

FIG. 2 is a block diagram of HMQ RKEY 200, according to an embodiment. While FIG. 2 illustrates an embodiment, other embodiments may omit, add to, reorder, and/or modify any of the elements shown. HMQ RKEY 200 may include, but is in no way limited to, hash 210, size 220, address 230, and permissions 240.

According to an embodiment, HMQ RKEY 200 comprises a certificate granted by the owner of a block of physical memory to a remote user. For example, using the embodiment illustrated in FIG. 1, software 130-M may authorize the node 105-1 access to a specific block in memory 120-M by sending node 105-1 an instance of HMQ RKEY 200, generated by software 130-M. When HMQ coprocessor 115-1 sends a command to HMQ coprocessor 115-M, HMQ coprocessor 115-1 may also send a copy of the earlier received instance of HMQ RKEY 200. HMQ coprocessor 115-M may validate the HMQ RKEY to ensure the command was not sent from an authorized HMQ coprocessor and is being stored in properly allocated memory. Alternatively, software 130-1 may send a command to HMQ coprocessor 115-M directly, or through HMQ coprocessor 115-1. The size of HMQ RKEY may be 16 bytes long, however the HMQ RKEY is not required to be 16 bytes long. A smaller HMQ RKEY may be preferable to reduce the memory footprint and network congestion, however a larger HMQ RKEY may allow for a longer and more secure hash.

Hash 210 is an encrypted hash derived from a base secret. Hash 210 may also be derived from, but is in no way limited to, the parameters: size 220, address 230, and permissions 240. Each of the HMQ coprocessors 115 contain the base secret, generated by software 130-1 through 130-M, respectively, in order to decrypt hash 210 upon receipt of an instance of HMQ RKEY 200. Other security models that use public key/private key encryption, hashes, seeds, secrets, or codes may also be implemented.

Size 220 is the size of the region an HMQ RKEY is authorized to access. Address 230 contains the physical address of the region that the HMQ RKEY generator (e.g., software 140-M) is authorized to access. Alternatively, address 230 may contain just a number that identifies a specific HMQ in memory, but is not the memory address of the HMQ. Furthermore, HMQ RKEY 200 may identify HMQ coprocessor control blocks ("CCB") instead of a destination address.

Permissions 240 are the permissions that the presenter (e.g., HMQ coprocessor 115-1) is given. For example, HMQ RKEY may give permission to write a message in a specific HMQ, but not read from the HMQ. In an embodiment, permissions 240 may include, but is in no way limited to, readable, writeable, and cache update.

The Hardware Message Queue ("HMQ")

Figure 3:
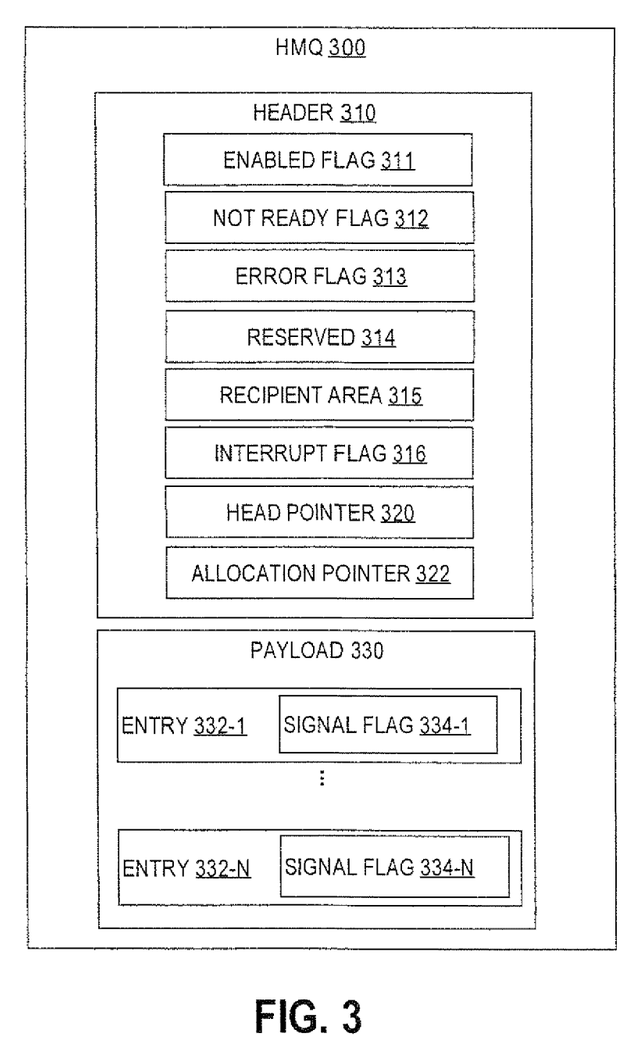
FIG. 3 is a block diagram of a hardware messaging queue, according to an embodiment of the invention.

FIG. 3 is a block diagram of HMQ 300, according to an embodiment. HMQ 300 comprises header 310 and payload 330. While FIG. 3 illustrates an embodiment, other embodiments may omit, add to, reorder, and/or modify any of the elements shown. Header 310 comprises metadata regarding the state of HMQ 300 and points to particular addresses within payload 330. Header 310 may include, but is in no way limited to, the size of payload 330, the number of entries 332-1 through 332-N (collectively referred to entries 332), and the size of each of entry 332-1 through 332-N. Header 310 may also include, but is in no way limited to, enabled flag 311, not ready flag 312, error flag 313, reserved field 314, recipient area 315, and interrupt flag 316. Header 310 may also include, but is in no way limited to, head pointer 320 and allocation pointer 322. For example, HMQs 140 are each instances of HMQ 300. HMQ coprocessors 115 and software 130-1 through 130-M, which allocate instances of HMQ 300, each have access to HMQs 140, respectively.

The entry size is the size of each of the entries 332. In an embodiment, entry size is 64 bytes. Alternatively, the entry size may be a power of two, however, other sizes may be suitable as well. Furthermore, the payload size and the entry size, stored in header 310, are both four bytes each. In another embodiment, the entry size may be zero to indicate that entries 332 may be any size.

Enabled flag 311 designates whether an instance of HMQ 300 is enabled or disabled. In an embodiment, enabled flat 311 is one byte. For example, if enabled flag 311 is set to zero, then HMQ 300 is disabled, but otherwise HMQ 300 is enabled.

Not ready flag 312 is copied to the first byte of a particular entry to indicate that the particular entry is invalid. In an embodiment, not ready flag 312 is one byte. For example, if a command is received to store a message that exceeds the length of entry 332-1, then the value stored in not ready flag 312 is copied to the first byte of entry 332-1, indicating the entry is invalid.

Error flag 313 is copied into the first byte of the entry to indicate that there was an error in processing a command. In an embodiment error flag 313 is one byte. For example, if HMQ 140-1 is full, HMQ coprocessor 115-1 may set error flag 313 to 1, to indicate that it cannot enqueue any new messages.

Reserved field 314 stores the offset between header 310 and payload 330. In an embodiment, reserved field 314 is four bytes and is zero if there is no offset between header 310 and payload 330. Alternatively, reserved field 314 is a pointer to payload 330. For example, if header 310 and payload 330 were not contiguous, reserved field 314 may comprise the address of payload 330 in memory 120-1.

Recipient area 315 is available to be used by an HMQ processor on the same node. In an embodiment, recipient area 315 is 32 bytes. For example, HMQ coprocessor 115-1 may use recipient area 315 to reassemble 16 byte chunks of a message (discussed in further detail infra).

Interrupt flag 316 indicates whether an interrupt should be raised upon a successful entry push. In an embodiment, interrupt flag 316 is a single bit and set to zero to indicate that an interrupt should be raised upon a successful entry push. For example, when HMQ coprocessor 115-1 successfully writes entry 332-1, to payload 330, HMQ coprocessor 115-1 sends an interrupt to processor 110-1.

Head pointer 320 is an atomically updated pointer and points to the next entry in payload 330 that is ready to be read. In an embodiment, head pointer 320 is a 64-byte multiple and is offset from the end of header 310. For example, if head pointer 320 has a value of zero, then head pointer 320 is effectively pointing to entry 332-1, of payload 330.

Allocation pointer 322 is an atomically updated pointer. In an embodiment, allocation pointer 322 is a 64-byte multiple and is offset from the end of header 310. For example, if allocation pointer 322 has a value of zero, then allocation pointer 322 is effectively pointing to entry 332-1, of payload 330. If head pointer 320 is equal to allocation pointer 322, payload 330 is considered empty. If, however, head pointer 320 minus allocation pointer 322 is equal to one, then payload 330 is considered full.

Additionally, in other embodiments, header 310 may include other flags or values needed to perform the functions described herein efficiently. Flags and pointers may be stored in one or more bits, bit fields, or bytes.

According to the embodiment in FIG. 3, payload 330 includes, but is in no way limited to, entries 332, which each contain signal flags 334-1 through 334-N (collectively referred to as "signal flags 334"), respectively. Each entry of entries 332 may be a fixed size, and the sum of the size of entries 332 may be equal to the payload size stored in header 310. For example, in the embodiment in FIG. 3, entries 332 are each 64 bytes long, and the size of payload 330 is 64 times N bytes.

Signal flags 334 may be used to indicate that particular entries 332 have not been read; that there was an error writing the entry; or that the entry is not ready. For example, entry 332-1, in HMQ 140-1, may be the last byte in entry 332-1 and may be set to one to indicate that a valid message is stored in entry 332-1, but has not been read. In an embodiment, signal flags 334 are stored in the last byte in each of the entries 332, respectively. In another embodiment, signal flags 334 are the first byte in each of the entries 332, respectively.

Initalization of HMQ

Figure 4:
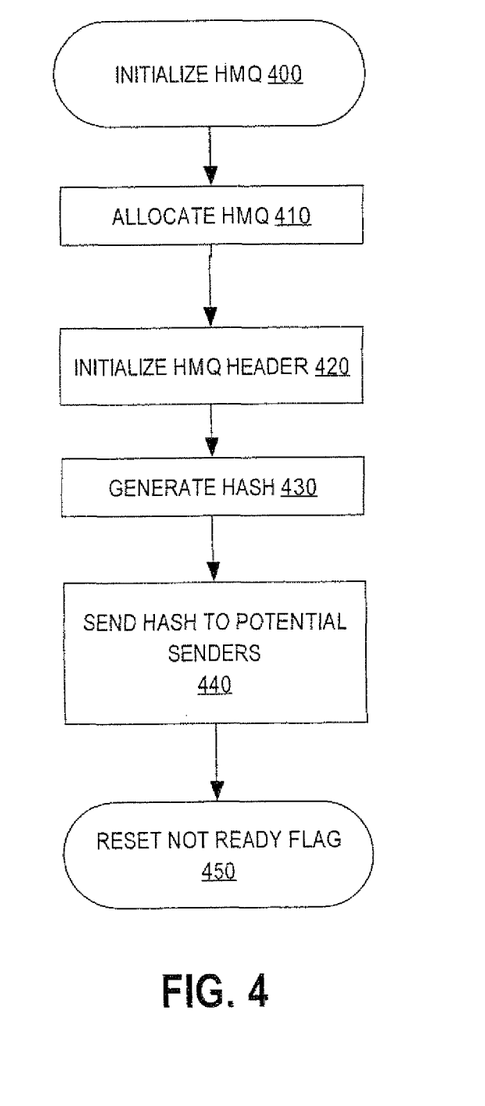
FIG. 4 is a flowchart illustrating initialization of an HMQ, according to an embodiment.

FIG. 4 is a flowchart illustrating initialization of an HMQ, according to an embodiment. While FIG. 4 illustrates exemplary steps according to an embodiment, other embodiments may omit, add to, reorder, and/or modify any of the steps shown. Although this embodiment describes initialization of an HMQ by software to atomically receive messages from multiple nodes on a multi-HMQ system, other embodiments may include many other steps based on the application and device.

As shown in FIG. 4, using the embodiment illustrated in FIG. 1 as an example, in step 410, software 130-1 allocates HMQ 140-1, which is an instance of HMQ 300. For example, allocating HMQ 140-1 comprises allocating header 310 and payload 330 contiguously. However, in other embodiments, header 310 and payload 330 may not be contiguous.

In step 420, software 130-1 initializes HMQ 140-1 header 310. For example, initializing header 310 may include, but is in no way limited to, setting enable flag 311 to one, setting not ready flag 312 to one, setting error flag 313 to zero, setting reserved field 314 to one, allocating 32 bytes for recipient area 315, setting interrupt flag 316 to zero, setting head pointer 320 to zero, setting allocation pointer 322.

In step 430, software 130-1 creates an instance of HMQ RKEY 200. Creating an instance of HMQ RKEY 200 may include, but is in no way limited to, software 130-1: setting size 220 to be the size of payload 330, allocated in step 410; designating address 230 to the be the address of payload 330. Step 430 may further include, but is in no way limited to, generating a base secret; storing the base secret in HMQ coprocessor 115-1; and generating hash 210, based on the base secret, size 220, address 230, and permissions 240.

In step 440, software 130-1 sends an instance of HMQ RKEY 200, created from step 430, to all nodes 105 on multi-HMQ system 100, which authorizes nodes 105 to send commands to HMQ coprocessor 115-1 and store data in HMQ 140-1.

In step 450, signal flags 334 may be set to indicate that HMQ coprocessor may write to each respective entry. For example, setting signal flags 334 to zero may indicate to HMQ coprocessor 115-1 that HMQ coprocessor is free to begin writing to the respective entries 332 into HMQ 140-1.

Authenticating Commands on Multi-HMQ System

Figure 5:
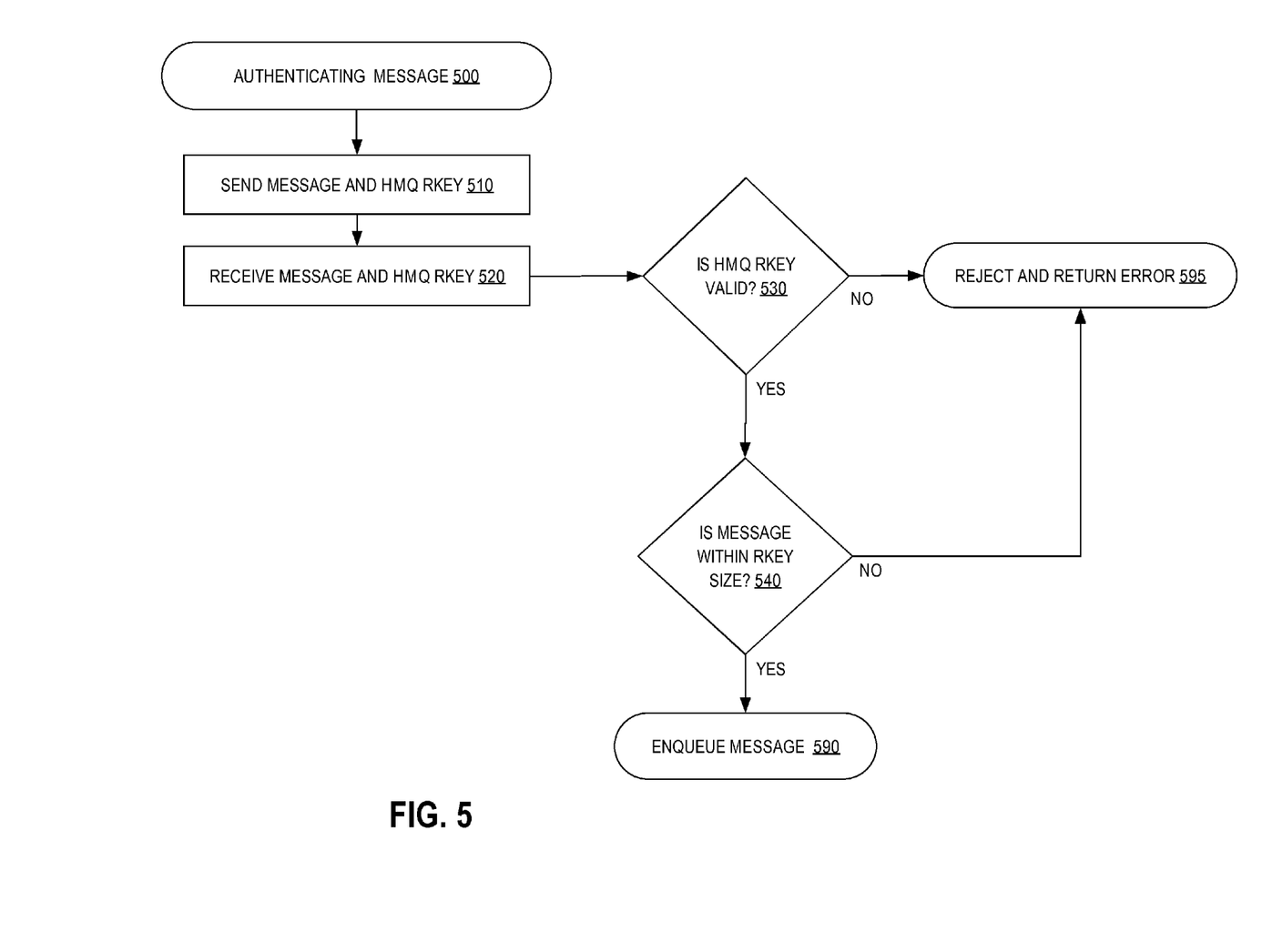
FIG. 5 is a flowchart illustrating authentication of a command, according to an embodiment.

FIG. 5 is a flowchart illustrating authenticating a command, according to an embodiment, using multi-HMQ system 100 as an example. While FIG. 5 illustrates exemplary steps according to an embodiment, other embodiments may omit, add to, reorder, and/or modify any of the steps shown. Although this embodiment describes authenticating a command between HMQ coprocessors 115, other embodiments may include many other steps based on the application and device.

In step 510, of FIG. 5, HMQ coprocessor 115-1 sends HMQ coprocessor 115-M a command and a copy of an HMQ RKEY, which node 105-1 received from software 130-M during initialization of HMQ 140-M. In step 520, HMQ coprocessor 115-M receives the command and the HMQ RKEY from step 510. HMQ coprocessor 115-1, may initiate sending a command. Furthermore, HMQ coprocessor 115-M may be both the sending and receiving HMQ coprocessor.

In step 530, of FIG. 5, HMQ coprocessor 115-M validates the HMQ RKEY sent by HMQ coprocessor 115-1. Since the HMQ RKEY is encrypted based on the address 230, an HMQ RKEY may be valid if the address 230 has not been altered. For example, as discussed above, HMQ coprocessor 115-M has a copy of the base secret, which was generated by software 130-M during the initialization of HMQ 140-M (step 430). HMQ coprocessor 115-M decrypts the HMQ RKEY hash 210. If hash 210 is valid, then the address 230 is valid, and HMQ coprocessor 115-M proceeds to step 540, otherwise HMQ coprocessor 115-M proceeds to step 595.

In step 540, of FIG. 5, to prevent a message from being written that begins inside the bounds of the allocated HMQ 140-M, but ends outside the bounds of the allocated HMQ 140-M, HMQ coprocessor 115-M checks to ensure that the size of the message does not exceed the HMQ RKEY size 220. If the size of the message to be written exceeds HMQ RKEY size 220, then HMQ coprocessor 115-M aborts, and proceeds to step 595; otherwise, HMQ coprocessor proceeds to step 590. As described above, HMQ coprocessor 115-M is not bound by an operating system and is not restricted as to where in memory 120-M HMQ coprocessor 115-M may write. For example, HMQ coprocessors 115 may abort such a command to prevent unauthorized writing into memory 120-1.

In step 590, of FIG. 5, HMQ coprocessor 115-M enqueues entry 332-1 based on the command received by HMQ processor 115-M. For example, HMQ coprocessor 115-M may use the enqueuing method illustrated in FIG. 6.

In step 595, of FIG. 5, HMQ coprocessor 115-M rejects the command and returns an error to HMQ coprocessor 115-1. In another embodiment, HMQ coprocessor 115-M may simply reject the command and not return any error to HMQ coprocessor 115-1.

In another embodiment, such as where the senders are all trusted, the command sent may not include an HMQ RKEY, or receiving HMQ coprocessor 115-M may simply execute a command without authenticating the HMQ RKEY first. In yet another embodiment, the HMQ RKEY may contain the address of the HMQ and an entry to be stored.

Enqueueing Messages in the HMQ

When HMQ coprocessor 115-M receives a command to atomically enqueue a message into the HMQ 140-M, HMQ coprocessor 115-M atomically enters the message into HMQ 140-M, which is designated in the HMQ RKEY sent with the command. The message is atomically stored by maintaining atomic allocation pointer 322.

Figure 6:
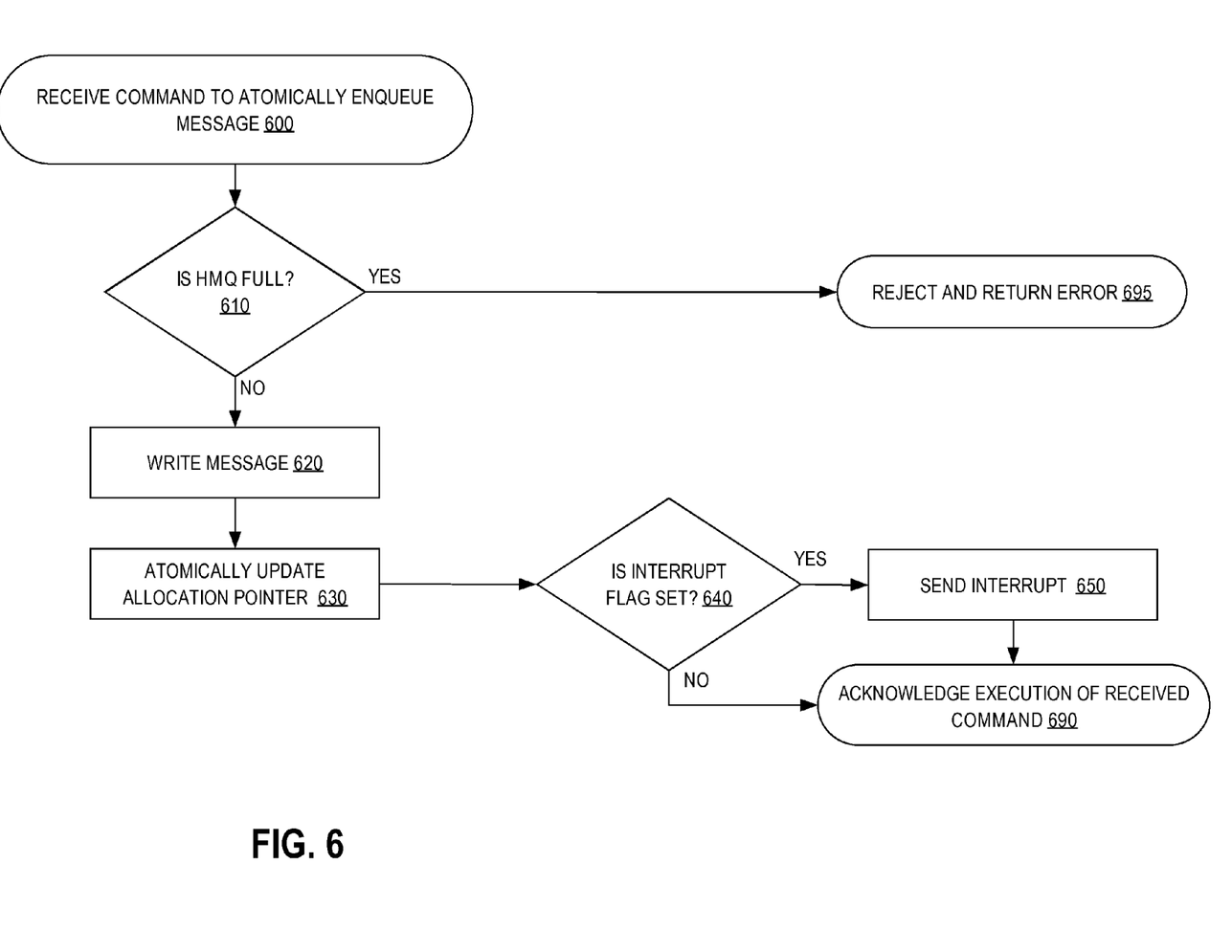
FIG. 6 is a flowchart illustrating atomically enqueuing a message in an HMQ, according to an embodiment.

FIG. 6 is a flowchart illustrating atomically enqueuing a message in HMQ 140-M, according to an embodiment. While FIG. 6 illustrates exemplary steps according to an embodiment, other embodiments may omit, add to, reorder, and/or modify any of the steps shown. Although this embodiment describes atomically enqueuing a message into an HMQ, other embodiments may include many other steps based on the application and device.

In step 600, of FIG. 6, continuing with the previous example in above, HMQ coprocessor 115-M receives and authenticates a command to atomically enqueue a message in HMQ 140-M.

In step 610, HMQ coprocessor 115-M determines whether HMQ 140-M is full. HMQ coprocessor 115-M determines the designated HMQ 140-M is full based on head pointer 320, allocation pointer 322, and the size of an entry in HMQ 140-M. If HMQ 140-M is full, HMQ coprocessor 115-M proceeds to yes branch, step 695, and otherwise HMQ coprocessor 115-M proceeds to no branch, step 620. In an embodiment, if allocation pointer 322 is equal to the quantity, head pointer 320 minus the size of an entry, then HMQ 140-M is full. In another embodiment, head pointer 320 and allocation pointer 322 are multiples of the entry size, thus if head pointer 320 minus allocation pointer 322 is equal to one, then HMQ 140-M is full. Note that in the embodiment described in FIG.

3, entries 332 are the same fixed size; however in other embodiment the size of entries 332 may not be the same or fixed size.

In step 620, HMQ coprocessor 115-M updates atomic allocation pointer 322 to point to the next entry in payload 330. For example, if, allocation pointer 322 stores a multiple of the entry size, then allocation pointer 322 is simply incremented by one, modulo the number of entries 332 in payload 330.

In step 630, HMQ coprocessor 115-M executes the command to atomically enqueue a message by storing the message in entry 332-1, which atomic allocation pointer 322 points to. For example, HMQ coprocessor 115-M may initialize entry 332-1 by setting signal flag 334-1 to indicate that entry 332-1 is not ready to be read. After writing the message to entry 332-1, HMQ coprocessor 115-M may clear signal flag 224-1, to indicate that entry 332-1 is complete, and HMQ coprocessor 115-M is no longer writing to it. HMQ coprocessor 115-M, then proceeds to step 640.

In step 640, HMQ coprocessor 115-M determines if interrupt flag 316 is set. If so, then, HMQ coprocessor 115-M proceeds to step 650. In step 650, HMQ coprocessor 115-M sends an interrupt to the operating system on node 105-M indicating that a new message has been enqueued. For example, HMQ coprocessor 115-M sends processor 110-M an interrupt with the value stored in interrupt flag 316. Further, HMQ coprocessor 115-M may write to L3 cache on processor 110-M indicating that a message has been enqueued.

If, in step 640, the interrupt is not set, or after step 650, HMQ coprocessor 115-M proceeds to step 690. In step 690, HMQ coprocessor acknowledges to sender, e.g., HMQ coprocessor 115-1, that the received command has been executed. In another embodiment, in step 690, HMQ coprocessor 115-M does not send any acknowledgement to sender, e.g., HMQ coprocessor 115-1, but instead HMQ coprocessor 115-M merely waits to receive another command.

In step 695, HMQ coprocessor 115-M does not execute a command to store a message in HMQ 140-M and returns an error to the sender, e.g., HMQ coprocessor 115-1. In another embodiment, HMQ coprocessor 115-M does not return an error to HMQ coprocessor 115-1, but instead merely rejects the command received, and waits to receive a new command. In yet another embodiment, HMQ coprocessor 115-M waits for a particular amount of time and again attempts to store the command received from HMQ coprocessor 115-1, returning to step 610.

Dequeuing an Entry from an HMQ

Figure 7:
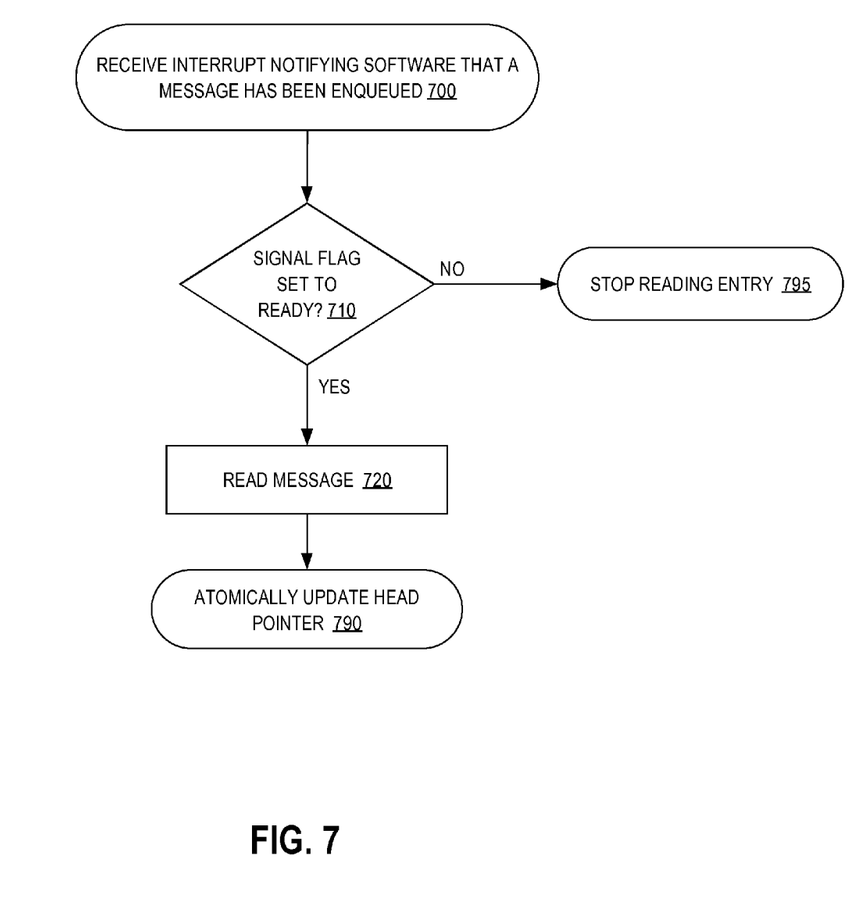
FIG. 7 is a flowchart illustrating reading a message stored in a particular entry and dequeuing the entry, according to an embodiment.

FIG. 7 is a flowchart illustrating reading a message stored in a particular entry and dequeuing the entry, according to an embodiment. While FIG. 7 illustrates exemplary steps according to an embodiment, other embodiments may omit, add to, reorder, and/or modify any of the steps shown. Although this embodiment describes reading a message stored in a particular entry and dequeuing the entry, other embodiments may include many other steps based on the application and device.

In step 700, of FIG. 7, continuing from the previous example, software 130-M receives an interrupt indicating that an entry 332-1 has been enqueued. In another embodiment, software 130-M polls HMQ coprocessor 115-M to determine whether a new entry has been enqueued. If HMQ coprocessor 115-M is empty software 130-M may not attempt to read an entry.

In step 710, of FIG. 7, software 130-M checks signal flag 334-1, of entry 332-1, which head pointer 320 points to, to ensure that the message stored in entry 332-1 is ready to be read. If entry 332-1 is ready to be read, then software 130-M branches to yes, step 720, otherwise software 130-M branches to no, step 795. In another embodiment, the L3 cache on processor 110-M may contain the address of the entry ready to be read.

In step 720, of FIG. 7, the message in entry 332-1 is read, by software 130. Software then proceeds to step 790. For example, software 130 may copy entry 332-1 to another place in memory, or in a file, or file socket.

In step 790, of FIG. 7, software 130-M updates head pointer 320 to point to the next entry in payload 330. For example, if head pointer 320 is a multiple of the entry size, then head pointer 320 is incremented by one, modulo the number of entries 332 in payload 330. In another embodiment, software 130-M atomically updates head pointer 320 to the address of the next entry in payload 330. Software 130-M may also update signal flag 334-1 to indicate that entry 332-1 was read and is free.

In step 795, software 130-M may stop its attempt to read entry 332-1, which head pointer 320 points to. In another embodiment, software 130-M may return to step 710. Alternatively, software 130-M may wait for a particular amount of time and return to step 710.

Synchronizing Messages Received

Commands issued to an HMQ coprocessor may be synchronized. For example, HMQ coprocessor 115-M may notify HMQ coprocessor 115-1 that the command HMQ coprocessor 115-1 sent was successfully executed, and may terminate the connection between HMQ coprocessors 115-1 and 115-M once the command has been executed.

Commands may be serially processed by the HMQ coprocessor 115-M. For example, commands that are received while HMQ coprocessor 115-M is busy may be enqueued for subsequent execution. For example, the HMQ coprocessor may have a serial flag, which if set to one, executes commands serially.

Commands may also be forced to execute conditionally upon successful completion of a previous command. Accordingly, each command may have a conditional flag. For example, if a second command is conditional on a first command, the conditional flag of the second command may be set such that the second command may be executed if the first command is executed without errors.

Reassembling Messages

To prevent multi-HMQ system congestion, a message associated with a command may be broken up. The receiving HMQ coprocessor may reassemble the message before executing the command. Note the receiver may receive the chunks in a different order than the chunks were sent. Thus, the HMQ coprocessor may not merely reassemble the chunks for a particular command and message, but may also order the chunks before reassembling. In an embodiment, the message portion may be broken up into chunks. Alternatively, both the command and the message may be broken up into chunks.

For example, using the embodiment illustrated in FIG. 1, HMQ coprocessor 115-1 may issue a command to HMQ coprocessor 115-M, with a message that is 128 bytes. Instead of sending the entire 128 byte message at once, HMQ coprocessor 115-1 breaks the message into 16 byte chucks, assigns each chunk a number, and sends each numbered chunk to HMQ coprocessor 115-M. HMQ coprocessor 115-M reassembles the numbered chunks in order based on the chunk number, and then executes the received command and stores the accompanying reassembled message.

Error Reporting

A receiving HMQ coprocessor may be configured to raise particular errors, or return particular errors to a sending HMQ coprocessor. For example, if an error occurs while HMQ coprocessor 115-M is processing a command sent from HMQ coprocessor 115-1, then HMQ coprocessor 115-M may raise one or more particular errors, and may also return the one or more errors to HMQ coprocessor 115-1.

An HMQ coprocessor may raise errors including, but in no way limited to, HMQ RKEY validation; a queue crossing a page boundary or HMQ RKEY region; a message size is not equal to the entry size specified in header 310; enabled flag 311 is set to zero or does not match an expected value; the message size is not a power of two; the payload 330 size is not a multiple of the message size; allocation pointer 322 does not lie in the range zero to the number of entries 332; or the HMQ 300, or specifically payload 330, is full. Furthermore, if an error is raised while attempting to write to entry 332-1, a value representing a particular error may be written to signal flag 334-1. Further still, error flag 313 may be set if an error is raised.

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
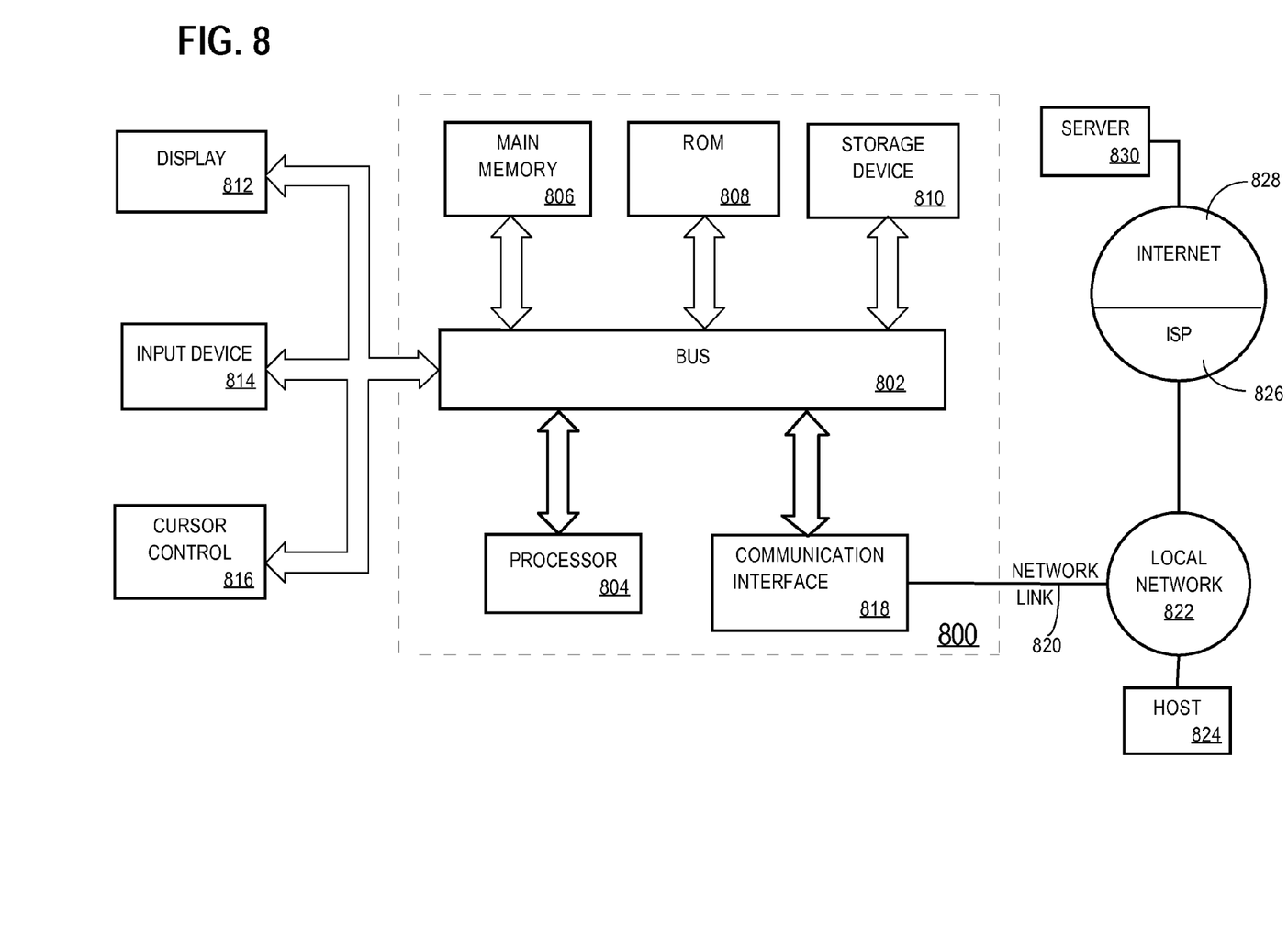
FIG. 8 illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to an embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A device comprising:
   enqueue circuitry;
   said enqueue circuitry being coupled to a memory;
   said enqueue circuitry being configured to, without said enqueue circuitry executing software from said memory:
      receive an enqueue command that comprises a key with an encrypted code, wherein the key identifies a queue in said memory;
      authenticate the encrypted code;
      enqueue a queue entry to the queue identified by the received enqueue command in response to receiving said enqueue command if the encrypted code was successfully authenticated.

2. The device of claim 1, wherein said device includes an integrated circuit chip that includes, separate from said enqueue circuitry, a processor, said processor being coupled to said enqueue circuitry.

3. The device of claim 1, wherein:
   said key is an RKEY; and
   said RKEY comprises the encrypted code.

4. The device of claim 1, wherein said enqueue circuitry is configured to authenticate the encrypted code based on a base secret stored a register in the enqueue circuitry.

5. The device of claim 1, wherein said enqueue circuitry being further configured to execute enqueue commands serially.

6. The device of claim 1, wherein said enqueue command includes a payload received in a plurality of chunks, and said enqueue circuitry being further configured to reassemble said plurality of chunks in response to receiving said enqueue command and said plurality of chunks.

7. The device of claim 1, wherein said enqueue command includes a payload received in a plurality of chunks, wherein said plurality of chunks were received in a different order than said plurality of chunks were sent; and said enqueue circuitry being further configured to reassemble said plurality of chunks in response to receiving said enqueue command and said plurality of chunks.

8. A method comprising a machine-executed operation involving software instructions, wherein said software instructions which, when executed by a computing device, cause performance of steps including;
   transmitting a particular enqueue command to an enqueue circuitry to enqueue a queue entry into a particular queue stored in a memory coupled to said enqueue circuitry, said particular enqueue command identifying said particular queue;
   wherein said enqueue circuitry is configured to, without said enqueue circuitry executing software from said memory:
      receive an enqueue command that comprises a key with an encrypted code, wherein the key identifies a queue of a plurality of queues using data that identifies said queue in said memory;
      authenticate the encrypted code based on a secret value that is associated with said queue, wherein the secret value is stored in a register in the enqueue circuitry;
      responsive to receipt of the enqueue command, to enqueue a queue entry to the queue identified by the received enqueue command if the encrypted code was successfully authenticated;
   dequeuing a queue entry from said queue.

9. The method of claim 8, wherein said enqueue circuitry is located on an integrated circuit chip that includes, separate from said enqueue circuitry, a processor, said processor being coupled to said enqueue circuitry.

10. The method of claim 8, wherein dequeuing a queue entry from said queue comprises setting a value in said queue entry to indicate that the queue entry has been read.

11. The method of claim 8, wherein dequeuing a queue entry from said queue comprises atomically setting a pointer to point to a queue entry that has not been read.

12. The method of claim 8, further comprising receiving an interrupt in response to said queue entry being enqueued.

13. The method of claim 8, wherein dequeuing a queue entry from said queue comprises copying said queue entry in memory.

14. A system comprising:
a first enqueue circuitry;
said first enqueue circuitry being operably coupled to a first memory and a second memory;
said first enqueue circuitry being configured to, without said first enqueue circuitry executing software from said first memory and said second memory:
  receive a first enqueue command, which comprises a first key with a first encrypted code, wherein said first key identifies a first queue in said first memory;
  authenticate said first encrypted code based on a first secret value that is associated with said first queue, wherein the first secret value is stored in a first register in the first enqueue circuitry;
in response to authenticating said first encrypted code, enqueue a first queue entry in said first memory based on said first key identifying said first memory;
receive a second enqueue command, which comprises a second key with a second encrypted code, wherein said second key-identifies a second queue in said second memory;
authenticate said second encrypted code based on a second secret value that is associated with said second queue, wherein the second secret value is stored in a second register in the first enqueue circuitry;
in response to authenticating said second encrypted code, enqueue a second queue entry in said second memory based on said second key identifying said second memory.

15. The system of claim 14, wherein:
said first key is a first RKEY that identifies said first memory;
said second key is a second RKEY that identifies said second memory.

16. The system of claim 15, wherein said first memory and said second memory both reside on the same physical memory.

17. The system of claim 14, wherein said first enqueue circuitry is further configured to:
execute said first enqueue command and said second enqueue command serially, wherein said second enqueue command is executed after said first enqueue command.

18. The system of claim 14, further comprising:
a second enqueue circuitry;
wherein said first enqueue command further comprises a first payload;
wherein said second enqueue circuitry configured to:
  disassemble said first payload into numbered chunks;
  send said numbered chunks to said first enqueue circuitry;
wherein said first enqueue circuitry is further configured to:
  receive said numbered chunks;
  reassemble said numbered chunks;
  execute said first enqueue command.

* * * * *